(12) United States Patent
Matsumoto et al.

(10) Patent No.: US 8,989,891 B2
(45) Date of Patent: Mar. 24, 2015

(54) MACHINING TOOL CONTROL SYSTEM AND CONTROL METHOD

(75) Inventors: Hitoshi Matsumoto, Saitama (JP); Hisashi Saito, Saitama (JP); Masaki Hara, Saitama (JP)

(73) Assignee: Citizen Machinery Co., Ltd., Nagano (JP)

( * ) Notice: Subject to any disclaimer, the term of this patent is extended or adjusted under 35 U.S.C. 154(b) by 233 days.

(21) Appl. No.: 13/122,327

(22) PCT Filed: Sep. 16, 2009

(86) PCT No.: PCT/JP2009/004643
§ 371 (c)(1),
(2), (4) Date: Apr. 1, 2011

(87) PCT Pub. No.: WO2010/044189
PCT Pub. Date: Apr. 22, 2010

(65) Prior Publication Data
US 2011/0184549 A1    Jul. 28, 2011

(30) Foreign Application Priority Data
Oct. 16, 2008    (JP) .................................. 2008-267711

(51) Int. Cl.
G06F 19/00    (2011.01)
G05B 11/01    (2006.01)
G05B 19/4068    (2006.01)

(52) U.S. Cl.
CPC .. G05B 19/4068 (2013.01); *G05B 2219/35259* (2013.01); *G05B 2219/35293* (2013.01)
USPC .............. 700/180; 700/23; 700/174; 700/159

(58) Field of Classification Search
CPC combination set(s) only.
See application file for complete search history.

(56) References Cited

U.S. PATENT DOCUMENTS

| | | | | | |
|---|---|---|---|---|---|
| 3,612,976 | A | * | 10/1971 | Tripp ............................. | 318/603 |
| 3,634,662 | A | * | 1/1972 | Slawson ........................ | 700/193 |
| 3,676,761 | A | * | 7/1972 | Fortune ......................... | 318/574 |
| 3,828,318 | A | * | 8/1974 | Bennett et al. ................ | 700/180 |
| 3,975,622 | A | * | 8/1976 | Horn et al. ...................... | 700/17 |
| 4,096,563 | A | * | 6/1978 | Slawson ........................ | 700/159 |
| 4,250,551 | A | * | 2/1981 | Paveglio et al. .............. | 700/181 |
| 4,312,033 | A | * | 1/1982 | Sweeney et al. ................ | 700/56 |
| 4,364,110 | A | * | 12/1982 | Hyatt ............................. | 700/180 |

(Continued)

FOREIGN PATENT DOCUMENTS

| | | |
|---|---|---|
| JP | 2-108106 | 4/1990 |
| JP | 03-251908 | 11/1991 |

(Continued)

OTHER PUBLICATIONS

Ivanescu et al., "Implementation of Sequential Function Charts with Microcontrollers", IEEE, 2007, 6 pages.*

*Primary Examiner* — Robert Fennema
*Assistant Examiner* — Thomas Stevens
(74) *Attorney, Agent, or Firm* — Howson & Howson LLP

(57) ABSTRACT

Provided are a control system and a control method by which a part of a continuously written machining program can be easily executed by a machine tool, and operation and the like of the machine tool can be checked. The control apparatus has an input device 102 which inputs a start instruction of a specific section of a machining program, and a partial executing device between the inputted start instruction of the specific section, and an end instruction that corresponds to the start instruction, to an operation executing device (101).

2 Claims, 3 Drawing Sheets

(56) References Cited

U.S. PATENT DOCUMENTS

| | | | |
|---|---|---|---|
| 4,370,705 A * | 1/1983 | Imazeki et al. | 700/79 |
| 4,509,126 A * | 4/1985 | Olig et al. | 700/173 |
| 4,550,375 A * | 10/1985 | Sato et al. | 700/169 |
| 4,566,061 A * | 1/1986 | Ogden et al. | 700/17 |
| 4,606,001 A * | 8/1986 | Rieben et al. | 700/183 |
| 4,887,221 A * | 12/1989 | Davis et al. | 700/181 |
| 5,023,432 A * | 6/1991 | Boykin et al. | 219/497 |
| 5,150,306 A * | 9/1992 | Kawamura et al. | 700/192 |
| 5,236,341 A * | 8/1993 | Stafford | 221/200 |
| 5,323,325 A * | 6/1994 | Izumiya | 700/174 |
| 5,404,288 A * | 4/1995 | McDunn | 700/21 |
| 5,457,369 A * | 10/1995 | Matsumura et al. | 318/569 |
| 5,485,390 A * | 1/1996 | LeClair et al. | 700/182 |
| 5,826,236 A * | 10/1998 | Narimatsu et al. | 705/7.24 |
| 5,903,459 A * | 5/1999 | Greenwood et al. | 700/110 |
| 6,256,773 B1 * | 7/2001 | Bowman-Amuah | 717/121 |
| 6,505,341 B1 * | 1/2003 | Harris et al. | 717/100 |
| 6,587,746 B1 * | 7/2003 | D'Souza | 700/182 |
| 7,931,447 B2 * | 4/2011 | Levin et al. | 417/38 |
| 8,244,386 B2 * | 8/2012 | Gray | 700/61 |
| 2007/0033068 A1 * | 2/2007 | Rao et al. | 705/2 |
| 2008/0091394 A1 * | 4/2008 | Hahn et al. | 703/7 |
| 2009/0038696 A1 * | 2/2009 | Levin et al. | 137/565.11 |
| 2009/0055016 A1 * | 2/2009 | Fujibayashi et al. | 700/159 |
| 2010/0030348 A1 * | 2/2010 | Scherer | 700/70 |

FOREIGN PATENT DOCUMENTS

| | | |
|---|---|---|
| JP | 08-328633 | 12/1996 |
| JP | 2000-89813 | 3/2000 |

* cited by examiner

FIG. 2   EXAMPLE OF PROGRAM

```
O0410
G50 Z-30.0
M09
M07
M52
G98 G01 Z0.1 F5000
M06
G00 Z1.0
G99 M03S●●
 N1500              ← STARTING COMMAND 120
 N0121T1300
 G50 U5.0
 G00 X8.0 Z1.0
 ...
 G00 Z1.0 T00
 G50U-5.0
 N1501              ← ENDING COMMAND 130
N0214 T1200
G50 W3.0
G00 X11.0 Z-2.0
...
X11.0 F0.2
G50 W-3.0
 N2000              ← STARTING COMMAND 120
 N0321 T2100
 G00 X11.0
 M32
 G01 X-1.0 F●●
 N2001              ← ENDING COMMAND 130
M33
X-3.0
T2100
M05
T1800
G00 Z1.0
G98 G01 Z-30.0 F3000
M56
M02
%
```

MACHINING TOOL CONTROL SYSTEM AND CONTROL METHOD

TECHNOLOGICAL FIELD

The present invention relates to a system and a method for controlling and actuating a machining tool based on a machining program.

BACKGROUND ART

One type of previously known system and method for controlling a machining tool is based on a machining program composed of sequential commands.

In another known control method, described in Japanese Patent No. 3515217 (Page 2, FIG. 2) for example, a cutting-stock diagram is displayed graphically, showing all the machining operations that can be carried out by the machining program. By selecting and designating a part of the cutting stock diagram, a machining tool can be made to execute a corresponding part of the machining program.

In still another known control system, described in laid-open Japanese Patent Application No. H3-251908 (Page 2, FIG. 2) for example, a starting command designates the start of a specific section of a machining program, and an ending command designates the end of the specific section.

DISCLOSURE OF THE INVENTION

Problems to be Solved by the Invention

A problem with the control method of Japanese Patent No. 3515217 is that, because a part of the machining program to be executed is selected indirectly, based on an instruction from the cutting-stock diagram, that part of the machining program cannot be executed readily.

Japanese laid-open Patent Application No. H3-251908 describes a specific section of a machining program in which program files of different kinds are sorted for more efficient processing in the control system. Japanese Patent Application H3-251908 does not consider the case of arbitrarily designating only a specific section of the machining program to cause a machining tool to execute the program.

Means for Solving the Problems

A first aspect of the invention solves the above-mentioned problems by providing a machining tool control system having an actuation executing means for actuating a machining tool based on a predetermined machining program and a partial executing means for causing the actuation executing means to execute a selected section of the machining program. The machining program includes a starting command for designating the start of a specific section, and an ending command for designating the end of the specific section. The control system is provided with an input means for specifying, i.e., entering, a predetermined starting command, and for inputting the specified starting commend to the partial executing means. The partial executing means instructs the actuation executing means to execute the section of the program between the starting command and the ending command corresponding to the specified starting command.

In addition to the control system according to the first aspect, a second aspect of the invention solves the above-mentioned problems by an arrangement such that the machining program includes a plurality of different sets of commands, each set comprising a starting command and a corresponding ending command, which respectively designate the start and end of a specific section of the program. The input means permits selection and input of a predetermined starting command out of a plurality of starting commands.

In addition to the arrangement of the control system of the first or second aspect, a third aspect of the invention solves the above-mentioned problems by arranging the actuation executing means to execute the whole machining program when no starting command is input to the partial executing means.

A fourth aspect of the invention solves the aforementioned problems by providing a machining tool control method for executing a selected section of a predetermined machining program which includes a starting command for designating the start of the specific section and an ending command for designating the end of the specific section. The control method includes an input step in which a predetermined starting command is entered, and an execution step in which an ending command corresponding to the input starting command is retrieved, and the section of the program between the starting command and the ending command is executed.

In addition to the arrangement of the control method according to the fourth aspect, a fifth aspect of the invention solves the above-mentioned problems by an arrangement such that the machining program includes a plurality of different sets of commands, each set comprising a starting command and a corresponding ending command which respectively designate the start and end of a specific section of the program, and in which, in the input step, selection and input of a predetermined starting command out of the plurality of starting commands takes place.

In addition to the arrangement of the control method described in the fourth or fifth aspect, a sixth aspect of the invention solves the above-mentioned problems by arranging the execution step to execute the whole machining program when no starting command is entered in the input step.

Advantageous Effects of the Invention

According to the first and fourth aspects of the invention, an operator can readily cause the machining tool to execute parts of operations of the machining program by entering the starting command of a specific section of the program designated in advance by a starting command preceding the specific section and a corresponding ending command following the specific section.

Because the specific section may be designated by a starting command and an ending command regardless of sequence numbers of the machining program, the specific section may be partly executed without being restricted by the sequence numbers, and the machining tool can be readily caused to execute a part of the machining program in which program commands are consecutively described. The operations of the machining tool may be checked even if the operator does not have total knowledge of the program and the sequence of the operations of the machining tool.

In addition to the advantageous effects described above, the second and fifth aspects of the invention permit the arbitrary selection of parts to be executed out of a plurality of predetermined specific sections. Thus, the selection and execution of a plurality of operations of the machining tool can be carried out readily.

In addition to the advantageous effects described above, according to the third and sixth aspects of the invention, if no starting command is detected, the whole machining program in which programs are consecutively described is executed. Thus normal machining may be performed without adding a special control step.

BRIEF DESCRIPTION OF DRAWINGS

FIG. 2 is an example of a program used in the control system and control method according to an embodiment of the invention.

DESCRIPTION OF REFERENCE NUMERALS

Figure 1:
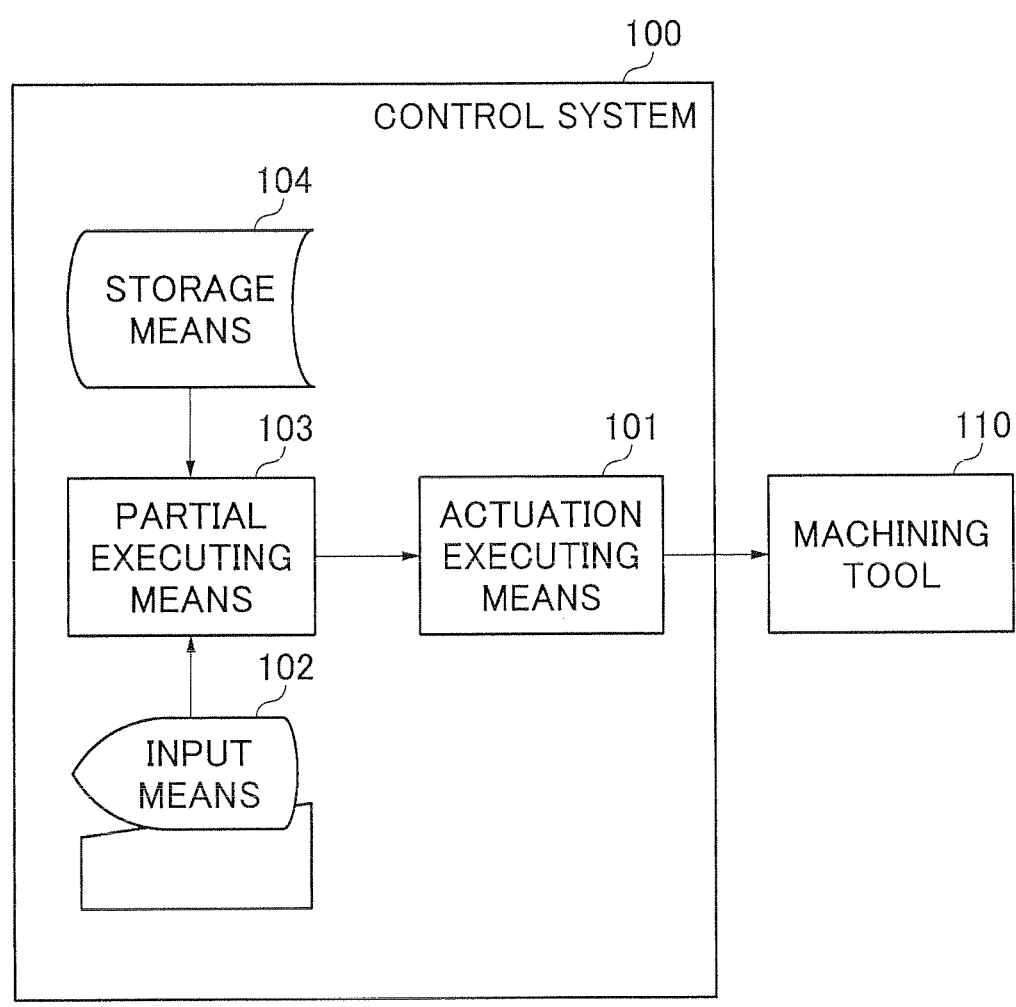
FIG. 1 is a concept diagram of a control system according to one embodiment of the invention.

100 . . . control system
101 . . . actuation executing means
102 . . . input means
103 . . . partial executing means
104 . . . storage means
110 . . . machining tool
120 . . . starting command
130 . . . ending command

BEST MODE FOR CARRYING OUT THE INVENTION

As shown in FIG. 1, a control system 100 of one embodiment of the present invention has an actuation executing means 101 for actuating a machining tool 110 based on a predetermined machining program, a storage means 104 for storing the machining program, a partial executing means 103 for causing the actuation executing means 101 to execute program commands in a predetermined specific section of the machining program and an input means 102 for inputting to the partial executing means 103.

As shown in FIG. 2, the program commands are described consecutively according to an execution sequence in the machining program. In the program, starting commands 120 (N1500 and N2000), which designate the start of specific sections, and ending commands 130 (N1501 and N2001), which designate ends of the specific sections of the program, are inserted in pairs before and after the specific sections, which are specified in advance. That is, specific sections of the machining program are preceded and followed by a starting command and an ending command.

The specific sections may be arbitrarily set in advance to execute only pertinent operations, e.g., checking of operations of the machining tool. These specific sections may be designated at a plurality of places. Parts of the specific sections may overlap, or a specific section may be included within another specific section because the starting commands 120 and the ending commands 130 of the respective specific sections are in discernible pairs.

The input means 102 can include a touch panel or a similar device for allowing an operator to enter a predetermined starting command, for example by entering a character string for the starting command, and to input the starting command to the partial executing means. Meanwhile, the partial executing means is arranged so as to instruct the actuation executing means 101 to execute the program commands of the specific section between the starting command and the ending command corresponding to the starting command entered through the input means 102.

Figure 3:
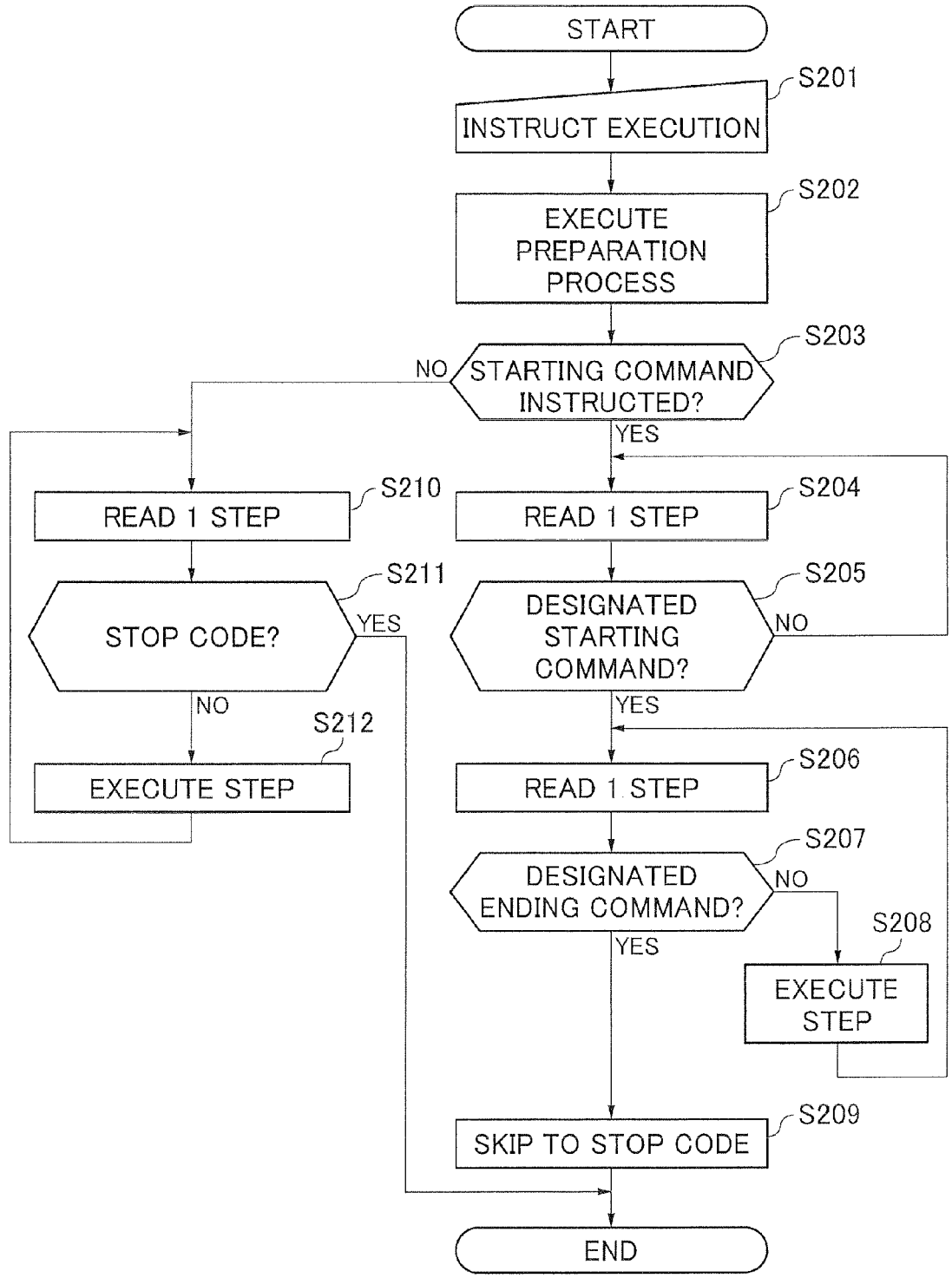
FIG. 3 is a flowchart of the control method of an embodiment of the invention.

The operation of the machining tool based on the machining program of the control system 100 will be explained with reference to a flowchart in FIG. 3.

When the specific section between the starting command N1500 and the ending command N1501 is to be executed for example, the operator enters "N1500", the starting command of the specific section, though the input means 102 (step S201). Then, the actuation executing means 101 executes preparation processes necessary for operating the machining tool (step S202). The partial executing means 103 determines that the starting command N1500 has been inputted (step S203) and retrieves the starting command N1500 from the machining program (steps S204 and S205).

When the partial executing means 103 reads the starting command N1500, the partial executing means 103 sends the program commands to the actuation executing means 101, beginning with the step immediately following the starting command N1500 until the ending command N1501 is read. Therefore, the actuation executing means 101 executes the program commands sequentially, step by step (steps S206, S207 and S208). The actuation executing means 101 causes the machining tool to execute the program commands sequentially.

When the partial executing means 103 reads the ending command N1501, which is paired with the starting command N1500, the partial executing means 103 skips to the STOP code part of the machining program (step S209), completing the operation of the machining tool. Thus, the specific section of the machining program (between commands N1500 and N1501) is executed, and the machining tool may be halted without continuing its operation after completion of the execution of the specific section.

When the whole machining program is to be executed by the machining tool, no starting command instruction of the starting command is entered through the input means 102. The actuation executing means 101 executes the preparation processes necessary for executing the operations of the machining tool (step S202). Then, the partial executing means 103 determines that no starting command has been inputted (step S203) and causes the machining tool to execute all the program commands sequentially (step S212) through the actuation executing means 101 while reading the machining program step by step (step S210) until it reads a STOP code of the machining program (step S211). Thus, the machining tool performs the normal series of operations of the machining program.

When the section between the commands N2000 and N2001 is to be executed, the operator enters the starting command "N2000" to through the input means 102, which sends the starting command to the partial executing means 103. When the plurality of sets of starting commands (e.g., N1500 and N2000) and their corresponding ending commands (e.g., N1501 and N2001) is provided to designate the start and end of different specific sections as described above, the partial executing means 103 can discern the pairs of starting commands 120 and ending commands 130 of the respective specific sections, and can partially execute a program section precisely when the operator specifies each starting command and causes it to be input to the partial executing means 103 by entering the starting command through the input means 102.

Accordingly, parts of the plurality of specific sections may overlap, or specific sections may be included within other specific sections.

Instead of directly entering the starting commands (e.g., N1500 and N2000) as character strings, the starting commands can be entered into the input means 102 by selection of a title on a panel display, e.g., a title that represents the operation corresponding to a program section, such as "start rotation of main spindle," or "return tool to original position." These titles, which are more readily comprehensible to the operator, can be set in advance in the input means, and related therein to the corresponding starting and ending commands.

DRAWING

FIG. 1:
100: CONTROL SYSTEM
101: ACTUATION EXECUTING MEANS
102: INPUT MEANS
103: PARTIAL EXECUTING MEANS
104: STORAGE MEANS
110: MACHINING TOOL
FIG. 2:
EXAMPLE OF PROGRAM
STARTING COMMAND (120)
ENDING COMMAND (130)
STARTING COMMAND (120)
ENDING COMMAND (130)
FIG. 3:
201: INSTRUCT EXECUTION
202: EXECUTE PREPARATION PROCESS
203: STARTING COMMAND INSTRUCTED?
204: READ 1 STEP
205: DESIGNATED STARTING COMMAND?
206: READ 1 STEP
207: DESIGNATED ENDING COMMAND?
208: EXECUTE STEP
209: SKIP TO STOP CODE
210: READ 1 STEP
211: STOP CODE?
212: EXECUTE STEP

The invention claimed is:

1. A machining tool control system having an actuation executing means for operating a machining tool by executing all of, and alternatively a selected part of, a predetermined machining program in which executable steps are sequentially written, and a partial executing means for causing said actuation executing means to execute, in sequence, the steps of a selected part of said predetermined machining program without subsequent execution of other parts of said predetermined machining program;

wherein said predetermined machining program includes a plurality of sections, each of said sections being less than said predetermined machining program in its entirety, each said section comprising a unique starting command for designating a start of said section, a corresponding ending command for designating an end of said section, and a plurality of executable steps for execution in sequence between said starting command and said ending command;

wherein said control system is provided with an input means for inputting any of the unique starting commands of said plurality of sections to said partial executing means;

wherein said control system includes means for carrying out a control sequence wherein a preparation process is executed, and wherein, following the execution of the preparation process, but before the execution of any part of said predetermined machining program by said actuation execution means, an automatic determination is made of whether or not a starting command has been entered into said input means;

wherein, said control system also comprises means, responsive to said determination, if a determination is made that a starting command has been entered into said input means, for selecting a section of said predetermined machining program from said plurality of sections in response to the entered starting command, and, when said actuation executing means is started, automatically causing said partial executing means to instruct said actuation executing means to execute the section of the program between the entered starting command and the ending command corresponding to the entered starting command, and to halt the operation of said machine tool upon completion of execution of said plurality of executable steps of the selected section of the program; and wherein, said means responsive to said determination, automatically causes said actuation executing means to execute said predetermined machining program in its entirety when said actuation executing means is started, if a determination is made that no starting command has been entered into said input means.

2. A machining tool control method comprising starting a predetermined machining program composed of sequentially executable steps, said program having plural sections, each of said plural sections having a start and an end, and including a unique starting command for designating the start thereof, a corresponding ending command for designating the end thereof, and a plurality of said executable steps for execution in sequence between said unique starting command and said ending command, said method comprising:

an input step wherein the unique starting command of a selected section of said plural sections is entered;

a process preparation step wherein a preparation process necessary for operation of the machine tool is executed;

a determining step carried out automatically in a machining tool control by a decision step in a control sequence, wherein, upon initiation of the operation of said predetermined machining program, and following the process preparation step, but before execution of a machining step in said predetermined machining program, a determination is made of whether or not a starting command has been entered in said input step;

an execution step wherein an ending command corresponding to the entered starting command is retrieved, and, in response to the entry of the starting command of said selected section, said plurality of executable steps between the entered starting command and the retrieved ending command is executed, and the execution of the machining program is halted automatically upon completion of the execution of said plurality of executable steps of the selected section; and restarting said machining program without entry of a starting command, and wherein upon said restarting of the machining program, said determining step determines that no starting command has been entered, and said predetermined machining program is executed automatically in its entirety.

* * * * *